Aug. 25, 1964     D. MANNHEIMER     3,146,444

SCAN MODULATED DOPPLER RADAR

Filed May 24, 1961     2 Sheets-Sheet 1

INVENTOR.
DAVID MANNHEIMER
BY
ATTORNEY

Aug. 25, 1964  D. MANNHEIMER  3,146,444
SCAN MODULATED DOPPLER RADAR
Filed May 24, 1961  2 Sheets-Sheet 2

INVENTOR.
DAVID MANNHEIMER
BY
ATTORNEY 3,146,444
SCAN MODULATED DOPPLER RADAR
David Manneheimer, Bayville, N.Y., assignor to Sperry Rand Corporation, Great Neck, N.Y., a corporation of Delaware
Filed May 24, 1961, Ser. No. 112,276
9 Claims. (Cl. 343—9)

The present invention generally relates to Doppler radars and, more particularly, to a scanning radar adapted to extract target velocity data from scan modulated target echo signals.

Numerous Doppler radar equipments are available in the art for producing ground velocity data useful in the navigation of aircraft. The prior art Doppler navigator systems differ from one another primarily in the type of carrier modulation, number and type of antennas employed, and in the techniques for antenna or ground speed data stabilization. Common to all Doppler navigators, however, are the problems of Doppler frequency tracking, Doppler frequency measurement and the determination of antenna radiation directions with respect to the aircraft ground track. The latter determination involves either precise antenna stabilization apparatus or relatively complicated data stabilization by means of a computer. Another problem common to prior art Doppler navigators is the inherent limitation that system accuracy degrades with time. That is, Doppler navigator equipments generally supply ground velocity data for the dead reckoning computation of aircraft position. Position determination is not "fail safe." Any inaccuracies in the determination of ground speed result in computational inaccuracies which increase with time. Consequently, auxiliary position fixing equipments have been provided to correct the dead reckoning computation over relatively long time intervals.

Position fixing often is accomplished with the aid of a conventional search radar, the search radar being operated in conjunction with the Doppler nagivator equipment. Aircraft drift angle can be measured at discrete time intervals with search radar but the usual operational technique involves the interruption of the normal search function by stopping the scanning of the antenna. In some cases this technique can prove to be highly objectionable; moreover, it neither gives drift angle continuously nor ground speed directly.

In accordance with the present invention, aircraft ground velocity data is determined with the aid of a continuously scanning antenna. The method by which the ground velocity data is obtained is based upon the principle that the Doppler frequency shift of a ground target signal varies sinusoidally at the antenna rotational frequency as the antenna is scanned in azimuth. It has been found that the Doppler frequency shifts of target signals returned from a finite irradiated ground area undergo coherent frequency variations due to antenna scanning. This phenomenon is exploited by the provision of a linear frequency discriminator in which the effects of frequency modulation of the Doppler signals attributable to antenna scanning are additively combined. No Doppler frequency tracker is required. The discriminator produces a resultant signal having a phase which is indicative of aircraft drift angle (angular deviation of aircraft heading from ground track) and having an amplitude indicative of aircraft ground speed (speed along said ground track). Filtering and synchronous detection means are provided to extract the drift angle and speed data from the resultant signal. The combination of the linear discriminator and the filtering and synchronous detection means efficiently rejects signal components which are not representative of ground velocity such as all amplitude modulated components and all frequency modulated components at other than the antenna scan frequency.

The Doppler radar apparatus of the present invention is fully compatible with conventional search radar systems including pulsed radar systems using short pulses for high range resolution. More particularly, the same azimuthally scanning antenna, pulsed transmitter, duplexing means, first detector, automatic frequency control, and local oscillator may be employed for both the search radar and Doppler functions. The operation of the Doppler apparatus in no way interferes with the normal search or position determining function of the search radar. An important feature of the invention is that the velocity data signal-to-noise ratio is greatly enhanced by the full utilization of the spectral energy of the continuously available ground target echo signals at all azimuth positions of the antenna.

It is the principal object of the present invention to provide a Doppler radar having a continuously scanning antenna.

Another object is to provide Doppler navigator apparatus having a scanning antenna for the simultaneous determination of aircraft ground speed, drift angle and position.

An additional object is to provide a Doppler radar using transmitting and receiving means suitable also for a simultaneous search radar function.

A further object is to provide apparatus for efficiently extracting target velocity data inherent in the echo signal returns at all azimuths of an azimuthally scanning short pulse search radar.

Another object is to provide an airborne radar for obtaining aircraft ground speed and drift angle data which is inherently independent of aircraft attitude.

A further object is to provide auxiliary apparatus for use with a conventional scanning search radar to determine target velocity data without interfering with the normal operation of the search radar.

The realization of these and other objects of the present invention will be better understood from the following specification and drawings of which:

The present invention is based upon the principle of utilizing the Doppler frequency shift variations of the reflected target signals which are received by a conventional azimuthally scanning search radar such as, for example, a scanning search radar utilizing pulses of short duration to obtain high range resolution. In contrast with the case of ordinary non-scanning airborne Doppler navigators, the actual Doppler frequency shift is not constant for a given target velocity. Instead, the Doppler frequency shift continuously varies with the scanning of the antenna, the shift being a maximum when the antenna is directed along the aircraft ground track and being zero when the antenna is directed at right angles to said ground track. The variation of Doppler frequency shift is measured to determine the velocity vector of the aircraft.

Figure 1:
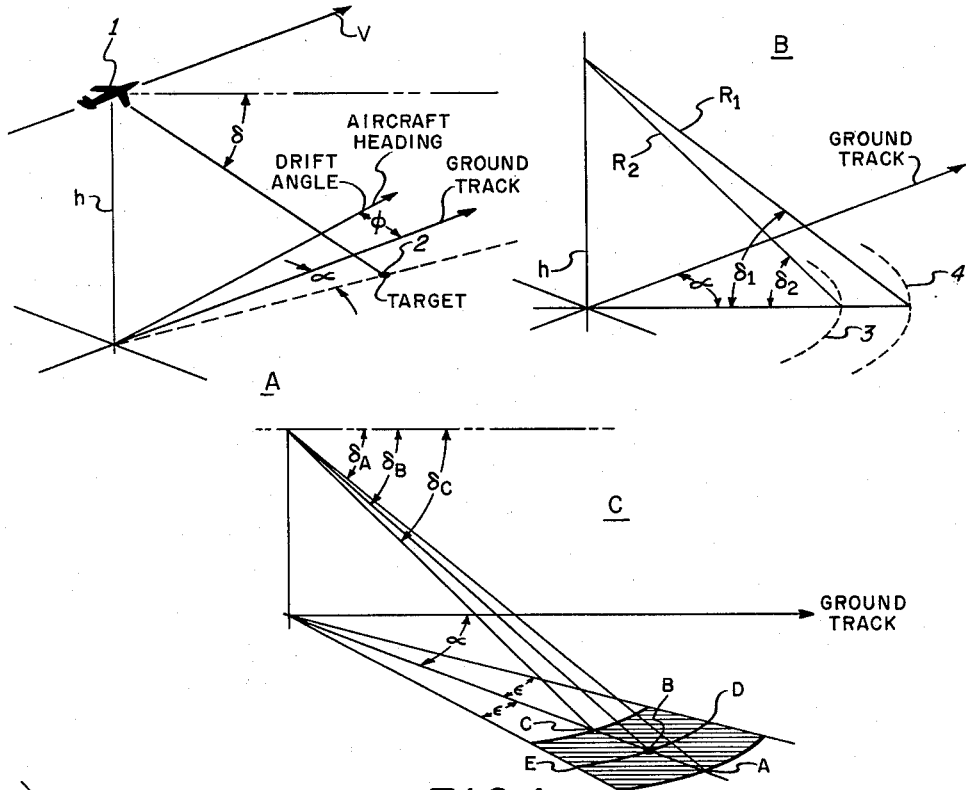
FIG. 1 is a series of diagrams representing the basic geometrical relationships encountered in a Doppler navigator system.

Referring to FIG. 1A, the numeral 1 designates an aircraft flying with a horizontal velocity V at a constant altitude $h$. It is assumed that the vertical velocity component of the aircraft is zero. In this case, the Doppler-shifted frequency of the echo signal received from point target 2 varies in accordance with the expression:

$$f_\mathrm{d} = \frac{2 f_\mathrm{T} V}{c} \cos \alpha \cos \delta$$

or its equivalent form, $$f_d = \frac{2V}{\lambda} \cos \alpha \cos \delta \qquad (1)$$

where $f_d$ = Doppler frequency shift
$f_T$ = frequency of transmitted radiation
$\lambda$ = wavelength of transmitted radiation
$c$ = velocity of light
$V$ = horizontal component of aircraft speed relative to the target
$\alpha$ = azimuth angle measured from the aircraft's ground track to the target
$\delta$ = depression angle measured from the aircraft's horizontal plane to the target (or elevation angle in the 'reverse direction)

Aircraft 1 is equipped with an antenna radiating a vertically oriented fan-shaped beam of electromagnetic energy. The antenna and beam are continuously rotated about a vertical axis at a constant angular velocity $\omega$. Thus, expression (1) may be rewritten as $$f_d = \frac{2V}{\lambda} \cos \delta \cos \omega t \qquad (2)$$

It should be noted that for a constant altitude condition, i.e., the vertical velocity component of aircraft 1 being substantially zero, the target signal returned from a ground target situated at a predetermined radial range will occur at a constant depression angle $\delta$ independent of aircraft attitude (aircraft pitch, roll, and yaw). Thus, cosine $\delta$ is a fixed quantity whereby expression (2) may be simplified to the form $$f_d = kV \cos \omega t \qquad (3)$$

By inspection of expression (3), it can be seen that due to antenna scanning the Doppler frequency shift of point targets lying at a constant radial range varies cosinusoidally about the aircraft ground track, the Doppler frequency shift being a maximum in the forward direction along said ground track.

It now becomes pertinent to examine the effect of the Doppler frequency shift from ground targets lying within a finite irradiated area rather than at a point location. The finite illuminated area is represented in FIG. 1B by the annular area embraced between dashed lines 3 and 4. As will be seen more fully later, range gating means are provided for making the Doppler navigator of the present invention selectively responsive only to signals returned by ground targets lying between the radial ranges $R_1$ and $R_2$ as the airborne search antenna is scanned in azimuth about a vertical axis. A particular irradiated ground area for a given azimuth angle of a scanning antenna is represented in FIG. 1C by the cross-hatched area. The area is defined by the relatively narrow azimuth extent of the fan-shaped radar beam and the relatively narrow range embraced by the range gate.

Considering first a dispersion in range of ground targets that lie along the line of constant bearing $\alpha$, such as points A, B, and C in FIG. 1C, the Doppler returns may be represented by the expressions $$f_A = k'V \cos \delta_A \cos \omega t \qquad (4)$$
$$f_B = k'V \cos \delta_B \cos \omega t \qquad (5)$$
$$f_C = k'V \cos \delta_C \cos \omega t \qquad (6)$$

By inspection of expressions (4), (5), and (6) it can be seen that all Doppler-shifted echo signals received from targets situated along lines of constant bearing $\alpha$ are modulated at the antenna scan frequency $\omega$ as the antenna rotates. Moreover, the scan modulations of all such targets are in phase. The Doppler frequency shifts of all the targets vary only in the magnitude of the frequency shift in accordance with the depression angle $\delta$. This is graphically depicted in the waveforms of FIG. 2A.

Figure 2:
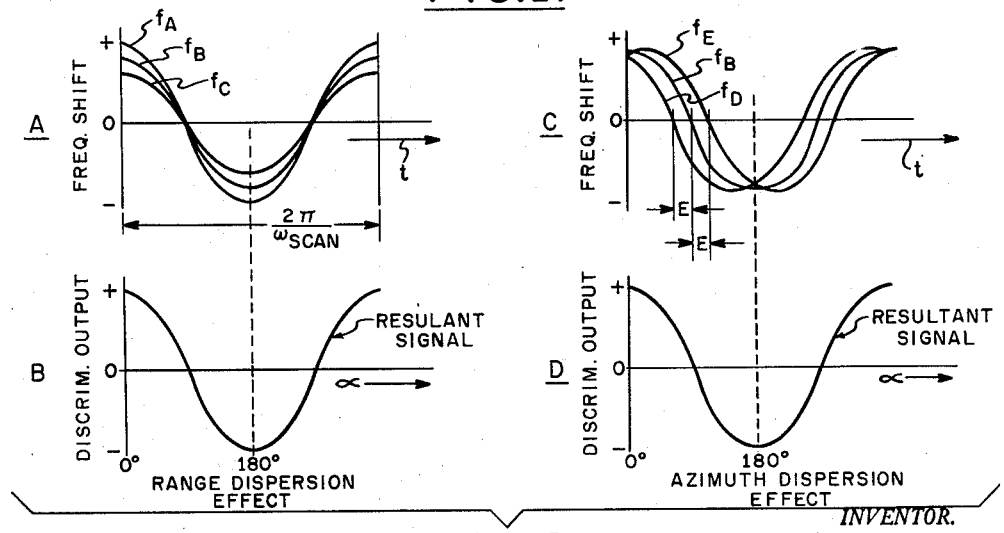
FIG. 2 is a series of idealized waveforms useful in explaining the signal demodulation theory on which the present invention is based.

When the Doppler-shifted signals $f_A$, $f_B$, and $f_C$ from the radar receiver are applied to a linear frequency discriminator, i.e., a discriminator having a substantially linear output amplitude vs. input frequency characteristic over the defined frequency range of interest, each will directly contribute to the predictable resultant signal amplitude depicted in FIG. 2B at the output of the discriminator. The in-phase contribution of signals $f_A$, $f_B$, and $f_C$ results from the fact that the signals individually are of the same phase and frequency, differing only in amplitude.

It is now appropriate to consider the effect produced by a dispersion of individual ground targets in azimuth at a constant range over the irradiated ground area. Referring again to FIG. 1C, three such azimuthally dispersed targets are represented by D, B, and E, points D and E being displaced from point B in opposite directions by the same angular increment $\epsilon$. The Doppler returns from points D, B, and E are represented by the waveforms $f_D$, $f_B$, and $f_E$ of FIG. 2C. The returns may also be represented by the expressions:

$$\begin{aligned} f_D &= k'V \cos \delta_B \cos (\omega t - \epsilon) \\ f_B &= k'V \cos \delta_B \cos \omega t \\ f_E &= k'V \cos \delta_B \cos (\omega t + \epsilon) \end{aligned} \qquad (7)$$

Assuming a radar beam which is symmetrical in azimuth, the individual Doppler signals $f_D$ and $f_E$ will produce discriminator output signals of the same form as $f_B$ of expression (7). The discriminator output signals produced by returns from points D and E will be combined into the form:

$$\begin{aligned} e_{out} &= k_2 k'V \cos \delta_B [\cos (\omega t - \epsilon) + \cos (\omega t + \epsilon)] \\ &= 2 k_2 k'V \cos \delta_B \cos \epsilon \cos \omega t \\ &= kV \cos \omega t \end{aligned} \qquad (8)$$

where $k_2$ represents the discriminator transfer function. It is apparent from expression (8) that the output signal from the discriminator will have the same phase and modulation frequency as the output signal resulting from the Doppler return $f_B$, point B lying along the center of the radar beam. Thus, all three signals $f_E$, $f_B$, and $f_D$ contribute to the single predictable resultant signal represented by the waveform of FIG. 2D at the output of the discriminator. To summarize, the Doppler frequency shift variations due to scanning are coherent so that by setting finite limits of summation in azimuth and range, a predictable resultant signal may be obtained at the output of the discriminator. The resultant signal varies cosinusoidally about the ground track at the antenna scan frequency.

Figure 3:
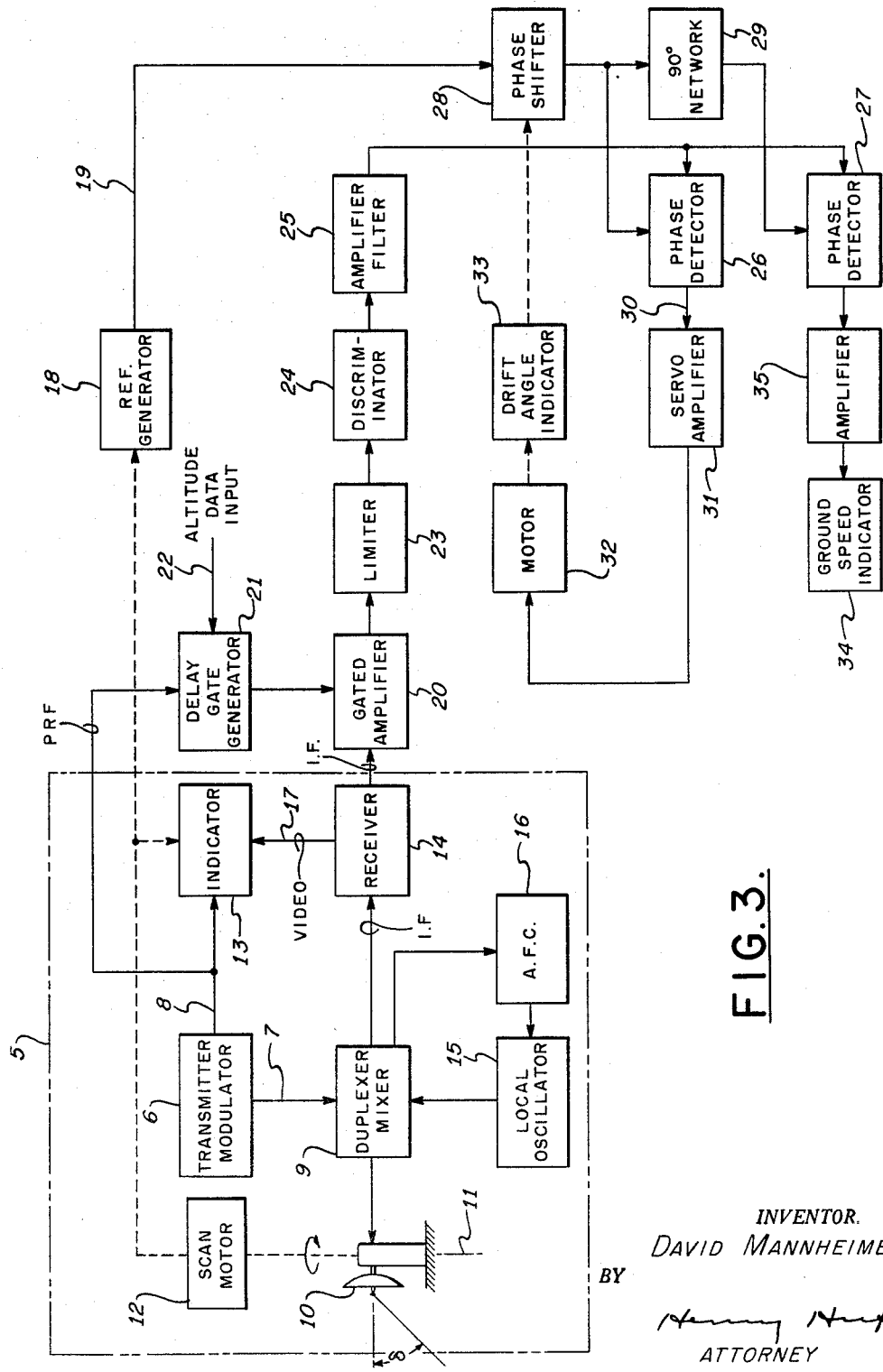
FIG. 3 is a simplified block diagram of an illustrative embodiment of the invention.

Referring to FIG. 3, a conventional azimuth scanning search radar is generally represented by the dotted block 5. The radar includes a transmitter modulator 6 which produces a pulsed microwave signal on line 7 and a series of pulse repetition rate triggers on line 8. The pulsed microwave signal is applied via duplexer-mixer 9 to antenna 10. Antenna 10 is continuously rotated about vertical axis 11 so as to cause a fan-shaped beam of microwave energy to scan in azimuth about said axis. Although the azimuth dimension of the beam preferably is narrow, the vertical dimension is sufficiently extensive to irradiate ground targets lying at the depression angle $\delta$ irrespective of the attitude of the aircraft which carries radar system 5. Antenna 10 is scanned in azimuth by motor 12. The position of the motor shaft and, hence, the azimuth position of the antenna is transmitted in conventional fashion to indicator 13 which may be of the PPI type. The shaft of rotor 12 also drives reference generator 18 to produce on line 19 a sinusoidally varying signal at a frequency determined by the rotational scanning rate of antenna 10. The phase of the reference signal produced on line 19 is fixed relative to the aircraft.

Received echo signals from the ground targets irradiated by the microwave beam are received by antenna 10 and converted in duplexer-mixer 9 to a suitable IF frequency for application to receiver 14. The frequency conversion is accomplished in the usual manner with the aid of local oscillator 15 whose frequency is maintained by the action of automatic frequency control circuit 16. The target signals at intermediate frequency are detected within receiver 14 and applied at video signals via line 17 to indicator 13. Indicator 13 displays the received ground target signals in terms of their azimuth and range coordinates in the usual fashion.

The intermediate frequency echo signals at the output of duplexer-mixer 9 are amplified and applied by receiver 14 to a first input of gated amplifier 20. Amplifier 20 is rendered conductive in response to a gating signal generated by delay gate generator 21. Generator 21 produces said gating signal after a controlled delay following the occurrence of each pulse repetition rate trigger on line 8 which is connected to a first input of generator 21. The amount of delay introduced by generator 21 is controlled in accordance with signal data respecting aircraft altitude as applied by input line 22.

The purpose of delay gate generator 21 is to control amplifier 20 in such a way as to maintain constant or predictable the depression angle δ for all fixed altitude values to satisfy expression (3). The range gating of the echo signals obviates the necessity for precise antenna stabilization. The only antenna stabilization required is that to insure adequate target signal strengths under the worst conditions of aircraft attitude change that might be encountered. The effect of an antenna stabilized to maintain constant the depression angle δ can be achieved merely by maintaining a fixed ratio of range gate position to aircraft altitude.

The range gated IF signals at the output of amplifier 20 are applied to limiter 23 for the purpose of eliminating random signal amplitude variations which might be present. It should be noted, however, that the use of a limiter is not mandatory especially where the frequencies of the random signal amplitude variations are other than the azimuth scanning frequency of antenna 10 as determined by motor 12. The amplitude limited signals at the output of limiter 23 are applied to linear frequency discriminator 24. As previously discussed, the target echo signals received from all points within the illuminated ground target area coherently add together in discriminator 24 to produce a single resultant output signal. The resultant output signal frequency is equal to the azimuth scanning frequency of antenna 10. The amplitude of the resultant signal is a measure of aircraft ground track speed. The phase of the resultant signal relative to the phase of the reference signal of line 19 is a measure of aircraft drift angle.

The signal at the output of discriminator 24 is applied via amplifier filter 25 jointly to the first inputs of phase detectors 26 and 27. It is preferred that the bandpass of amplifier filter 24 be adjusted to pass substantially only signal components at the scanning frequency of antenna 10. The reference signal of line 19 is applied via phase shifter 28 to a second input of phase detector 26 and, via phase shifter 28 and 90° phase shift network 29, to a second input of phase detector 27.

As is well understood, phase detector 26 produces an output signal on line 30 having an amplitude related to the phase difference between the two input signals and having a polarity indicative of the sense of said difference. The output or error signal of line 30 is applied by servo amplifier 31 to drive motor 32 in a sense and by an amount determined by the polarity and amplitude of the error signal. The shaft of motor 32 simultaneously positions drift angle indicator 33 and phase shifter 28. Motor 32 adjusts the amount of phase shift introduced by phase shifter 28 in the reference signal of line 19 until the phase-shifted reference signal is brouhgt into phase quadrature with the output signal of amplifier filter 25. Under the condition of phase quadrature, the error signal disappears at the output of phase detector 26 and motor 32 is deenergized. It will be seen that the amount of phase shift introduced by phase shifter 28 is a direct measure of the relative bearing of the aircraft ground track. This follows from the facts that the peak amplitude of the sinusoidally varying signal at the output of filter 25 occurs when antenna 10 is positioned in the direction of the aircraft ground track whereas the peak amplitude of the reference signal of line 19 occurs when antenna 10 is positioned along a predetermined direction relative to the aircraft.

Inasmuch as the two input signals to phase detector 26 are brought into a phase quadrature relationship by the action of the servo loop, it can be seen that the two inputs to phase detector 27 are brought into an in-phase relationship. Consequently, the output signal of phase detector 27 is a measure only of the amplitude of the output signal of filter 25, which in turn is a measure of aircraft ground speed. The output signal of detector 27 is applied to ground speed indicator 34 via amplifier 35.

It can be seen from the preceding specification that the objects of the present invention have been accomplished in a typical embodiment by exploiting the Doppler signal data inherent in the pulsed echo signals received by a moving azimuthally scanning radar antenna. The Doppler signal data is extracted from the echo signals by first gating out only those echo signals which occur at a predetermined radial range. The range gated echo signals are applied to a linear frequency discriminator wherein they coherently add to produce a single resultant output signal having a frequency equal to the antenna scanning frequency, having a phase indicative of aircraft drift angle and having an amplitude proportional to aircraft ground speed. Aircraft ground speed is determined merely by measuring the amplitude of the resultant output signal. Aircraft drift angle data is extracted by phase comparing the resultant output signal with a reference signal of the same frequency and predetermined phase.

The combination of the linear frequency discriminator and the coherent phase detection of the discriminator resultant output signal provides the action of a highly efficient Doppler signal filter whereby the energies from all of the received echo signals irrespective of relative bearing contribute to the drift angle and ground speed determinations. An important feature of said combination is that all amplitude modulation components and all frequency modulation components excepting those due to antenna scanning and target speed are substantially rejected and do not interfere with the determination of velocity data.

Although a continuously rotating scanning antenna has been utilized in the illustrative embodiment of FIG. 3, the invention also contemplates the provision of a sector scanning antenna such as, for example, an antenna adapted to scan back and forth through a predetermined angular extent less than 180° on either side of the aircraft ground track. In such a case, the waveshape at the output of the linear discriminator will have a known fundamental component related to the antenna scan frequency which can be coherently demodulated to produce a measure of ground velocity.

It shouuld be noted that the present invention is particularly suited for the modification of conventional existing search radars to provide aircraft drift angle and ground speed data. One important aspect of the invention is that the extraction of said data is accomplished without interfering in any manner with the normal operation of the airborne search radar.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A Doppler radar comprising means for irradiating a target object with a scannable beam of microwave energy, means for scanning said beam and for generating a reference signal having a frequency equal to the scanning frequency of said beam, means for receiving echo signals from said target object, a frequency discriminator connected to the output of said means for receiving, phase comparing means having two inputs, one of said inputs being connected to the output of said discriminator and the other of said inputs being coupled to receive said reference signal, said phase comparing means producing an output signal representing the direction of the radial velocity of said target object relative to said radar, and signal amplitude measuring means coupled to said output of said discriminator for providing an indication of the magnitude of said radial velocity of said target object relative to said radar.

2. In a Doppler radar having means for irradiating a target object with a scannable beam of microwave energy, means for scanning said beam and for generating a reference signal having a frequency equal to the scanning frequency of said beam, and means for receiving echo signals from said target object, apparatus for extracting target velocity data from the received echo signals, said apparatus comprising a frequency discriminator connected to the output of said means for receiving, phase comparing means having two inputs, one of said inputs being connected to the output of said discriminator and the other of said inputs being coupled to receive said reference signal, said phase comparing means producing an output signal representing the direction of the radial velocity of said target object relative to said radar and signal amplitude measuring means coupled to said output of said discriminator for providing an indication of the magnitude of said radial velocity of said target object relative to said radar.

3. Radar means for determining the position and radial velocity of a target object relative to said radar means, said radar means comprising means for irradiating said target object with a scannable beam of microwave energy, means for scanning said beam and for generating a reference signal having a frequency equal to the scanning frequency of said beam, means for receiving echo signals from said target object, target position indicator means connected to said means for receiving and coupled to said means for scanning, a frequency discriminator connected to the output of said means for receiving, phase comparing means having two inputs, one of said inputs being connected to the output of said discriminator and the other of said inputs being coupled to receive said reference signal, said phase comparing means producing an output signal representing the direction of the radial velocity of said target object relative to said radar, and signal amplitude measuring means coupled to said output of said discriminator or providing an indication of the magnitude of said radial velocity.

4. An airborne Doppler radar for determining aircraft drift angle and ground speed, said radar comprising means for irradiating ground target objects with a scannable beam of microwave energy, means for scanning said beam about a vertical axis and for generating a reference signal having a frequency equal to the scanning frequency of said beam, means for receiving echo signals from said target objects, a frequency discriminator connected to the output of said means for receiving, phase comparing means having two inputs, one of said inputs being connected to the output of said discriminator, and the other of said inputs being coupled to receive said reference signal, said phase comparing means producing an output signal representing said aircraft drift angle, and signal amplitude measuring means coupled to said output of said discriminator for providing an indication of said aircraft ground speed.

5. An airborne Doppler radar for determining aircraft drift angle and ground speed, said radar comprising means for irradiating ground target objects with a scannable beam of pulsed microwave energy, means for scanning said beam about a vertical axis and for generating a reference signal having a frequency equal to the scanning frequency of said beam, means for selectively receiving echo signals from those of said target objects which are at a predetermined range from said radar, a frequency discriminator connected to the output of said means for receiving, phase comparing means having two inputs, one of said inputs being connected to the output of said discriminator, and the other of said inputs being coupled to receive said reference signal, said phase comparing means producing an output signal representing said aircraft drift angle, and signal amplitude measuring means coupled to said output of said discriminator for providing an indication of said aircraft ground speed.

6. An airborne Doppler radar for determining aircraft drift angle and ground speed, said radar comprising means for irradiating ground target objects with a scannable beam of pulsed microwave energy, means for scanning said beam about a vertical axis and for generating a reference signal having a frequency equal to the scanning frequency of said beam, means for receiving echo signals from said target objects, range gating means connected to the output of said means for receiving for selectively passing echo signals from those of said target objects which are at a predetermined range from said radar, means connected to said range gating means for controlling the operation thereof as a function of aircraft altitude, a frequency discriminator connected to the output of said range gating means, phase comparing means having two inputs, one of said inputs being connected to the output of said discriminator and the other of said inputs being coupled to receive said reference signal, said phase comparing means producing an output signal representing said aircraft drift angle, and signal amplitude measuring means coupled to said output of said discriminator for providing an indication of said aircraft ground speed.

7. Apparatus auxiliary to a continuously scanning search radar for determining target velocity data from the target echo signals received by said radar, said apparatus comprising means for producing a reference signal having a frequency determined by the scanning frequency of said search radar, a frequency discriminator connected to receive said target echo signals, phase comparing means having two inputs, one of said inputs being connected to the output of said discriminator and the other of said inputs being coupled to receive said reference signal, said phase comparing means producing an output signal representing the direction relative to said radar of the radial velocity of the target object producing said echo signals, and signal amplitude measuring means coupled to said output of said discriminator for producing an indication of the magnitude of said radial velocity.

8. Apparatus auxiliary to a continuously scanning search radar for determining target velocity data from the target echo signals received by said radar, said apparatus comprising means for producing a reference signal having a frequency equal to the scanning frequency of said search radar, range gating means for selectively passing those of said echo signals which are reflected from targets at a predetermined range from said radar, a frequency discriminator connected to the output of said range gating means, phase comparing means having two inputs, one of said inputs being connected to the output of said discriminator and the other of said inputs being coupled to receive said reference signal, said phase comparing means producing an output signal representing the direction relative to said radar of the radial velocity of the targets producing said echo signals which are passed by said range gating means, and signal amplitude measuring means coupled to said output of said discriminator for producing an indication of the magnitude of said velocity.

9. Apparatus auxiliary to a continuously scanning search radar for determining target velocity data from the target echo signals received by said radar, said apparatus comprising means for producing a reference signal having a frequency equal to the scanning frequency of said search radar, range gating means for selectively passing those of said echo signals which are reflected from targets at a predetermined range from said radar, a frequency discriminator connected to the output of said range gating means, phase comparing means having two inputs, filter means for selectively passing signals at the frequency of said reference signal, said filter means coupling one of said inputs of said phase comparing means to the output of said discriminator, the other of said inputs of said phase comparing means being coupled to receive said reference signal, said phase comparing means producing an output signal representing the direction relative to said radar of the radial velocity of the targets producing said echo signals which are passed by said range gating means, and signal amplitude measuring means coupled to said output of said discriminator for producing an indication of the magnitude of said velocity.

References Cited in the file of this patent
UNITED STATES PATENTS

| | | |
|---|---|---|
| 2,853,700 | Cherry | Sept. 23, 1958 |
| 2,986,729 | Walker | May 30, 1961 |